(12) United States Patent
Huang et al.

(10) Patent No.: US 7,997,986 B2
(45) Date of Patent: Aug. 16, 2011

(54) STEERING WHEEL-SHAPED JOYSTICK FOR ARCADE GAME MACHINE

(75) Inventors: Hsin-Wei Huang, Taipei (TW); Cheng-Yuan Chi, Taipei (TW)

(73) Assignee: International Games System Co., Ltd., Taipei (TW)

( * ) Notice: Subject to any disclaimer, the term of this patent is extended or adjusted under 35 U.S.C. 154(b) by 942 days.

(21) Appl. No.: 11/941,486

(22) Filed: Nov. 16, 2007

(65) Prior Publication Data

US 2008/0220868 A1 Sep. 11, 2008

(30) Foreign Application Priority Data

Mar. 6, 2007 (TW) ................................. 96107705 A

(51) Int. Cl.
*G06F 17/00* (2006.01)
(52) U.S. Cl. .......................................................... 463/38

(58) Field of Classification Search .................... 463/38, 463/30–33; 345/161
See application file for complete search history.

(56) References Cited

U.S. PATENT DOCUMENTS

| 6,043,483 A * | 3/2000 | Schreiber ................. 250/231.13 |
| 7,193,607 B2 * | 3/2007 | Moore et al. .................. 345/156 |
| 2002/0075308 A1 * | 6/2002 | Divelbiss et al. ............. 345/762 |

\* cited by examiner

*Primary Examiner* — Ronald Laneau
(74) *Attorney, Agent, or Firm* — Rosenberg, Klein & Lee

(57) ABSTRACT

A steering wheel-shaped joystick of an arcade game machine is provided. The steering wheel-shaped joystick is rotated to generate a direction signal and send it to the arcade game machine. The steering wheel-shaped joystick includes a plurality of rods which are radiantly distributed, and includes at least one button at the end of the rods. The button is used to generate a function signal and send it to the arcade game machine so as to control ship-related electronic games of the arcade game machine.

10 Claims, 3 Drawing Sheets

STEERING WHEEL-SHAPED JOYSTICK FOR ARCADE GAME MACHINE

BACKGROUND OF THE INVENTION

1. Field of the Invention

The present invention relates to a steering wheel-shaped joystick, and in particular to a steering wheel-shaped joystick which is designated for an arcade game machine and used to control ship-related events of the electronic game.

2. Description of Related Art

A variety of electronic game platforms are available in our everyday lives, such as arcade game machines which are token-operated, video game consoles, personal computers (computer games are run in the personal computers), and hand-held game consoles. Users have fun in the virtual world through these various electronic game machines.

Because the hand-held game consoles are compact and small, there are much fewer controls on handheld game consoles than on other electronic game machines. Aside from the handheld game consoles, others game platforms can be compatible with various signal input devices such as mouse, keyboards, joysticks, etc. Game users are enthralled and entertained by electronic games through dedicated joysticks. There are various kinds of dedicated joysticks such as steering stick-shaped joysticks for air combat games, steering wheel-shaped joysticks for racing games or motorbike handle-shaped joysticks for water motorbike arcade game machines in amusement park.

Recently, Nintendo's Wii game consoles utilize a new kind of signal input devices and play a significant role in the electronic game machines. It is really revolutionary to improve and develop the signal input devices in the electronic game industry.

However, the steering wheel-shaped signal input devices and the motorbike handle-shaped signal input devices have been utilized in ship-related electronic games for many years. Since then, there are no killer devices of the signal input devices in the market. Most arcade game machines utilize conventional joysticks instead of dedicated joysticks for different electronic games. Then, development of the ship-related electronic games is stagnant, so the ship-related electronic games are not so popular as before.

Thus, there is a need for a steering wheel-shaped joystick which is designated for an arcade game machine and used to control ship-related events of the electronic games so that disadvantage described above will be overcome.

SUMMARY OF THE INVENTION

It is an object of the present invention to provide a steering wheel-shaped joystick which is designated for an arcade game machine and used to control the ship-related events of the electronic games. Because of realistic feel of navigation, users are appealed and impressed by the ship-related electronic games.

It is another object of the present invention to provide a steering wheel-shaped joystick of an arcade game machine. The steering wheel-shaped joystick is rotated to generate a direction signal and send it to the arcade game machine so as to control ship-related electronic games of the arcade game machine.

The steering wheel-shaped joystick of the present invention includes a plurality of rods which are radiantly distributed, and includes one button at the end of at least one rod. The button is used to generate a direction signal and send it to the arcade game machine.

The direction signal further includes a left-side signal and a right-side signal. The left-side signal is generated when the steering wheel-shaped joystick is counterclockwise rotated, and the right-side signal is generated when the steering wheel-shaped joystick is clockwise rotated.

Thus, the steering wheel-shaped joystick is used to control the ship-related events of the electronic games of the arcade game machine, and the steering wheel-shaped joystick provides glamorous appearance and realistic feel and convenience of navigation with users. The users are appealed to the electronic games so it promotes market growth of the arcade game machines industry.

BRIEF DESCRIPTION OF THE DRAWINGS

The present invention can be fully understood from the following detailed description and preferred embodiment with reference to the accompanying drawings, in which.

DETAILED DESCRIPTION OF THE PREFERRED EMBODIMENTS

The following detailed description is of the best presently contemplated modes of carrying out the invention. This description is not to be taken in a limiting sense, but is made merely for the purpose of illustrating general principles of embodiments of the invention. The scope of the invention is best defined by the appended claims.

Figure 1:
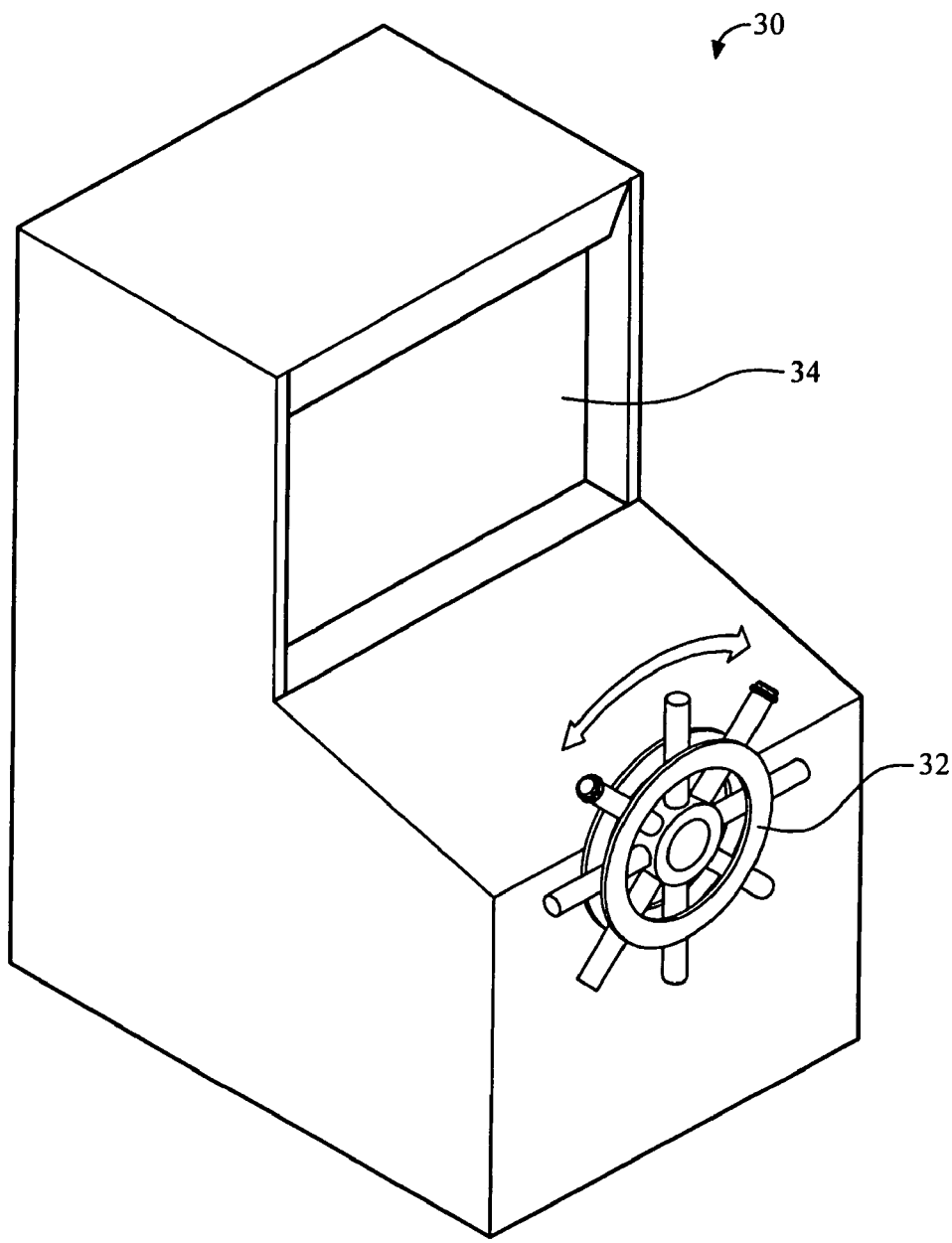
FIG. 1 is a perspective view of a steering wheel-shaped joystick and an arcade game machine according to the present invention.

Referring to FIG. 1, it illustrates a perspective view of an arcade game machine 30 and a steering wheel-shaped joystick 32 of the present invention. The steering wheel-shaped joystick 32 generates a direction signal and sends it to the arcade game machine 30 so as to control ship-related electronic games of the arcade game machine 30.

As described above, to control ship-related electronic games, the arcade game machine 30 is used to deal with the electronic games and displays images of the electronic games through a display device 34.

The direction signal further includes a left-side signal and a right-side signal. The left-side signal is generated when the steering wheel-shaped joystick 32 is counterclockwise rotated, and the right-side signal is generated when the steering wheel-shaped joystick 32 is clockwise rotated. In this light, ships of the electronic games are controlled and guided to the left side or the right side by the steering wheel-shaped joystick 32.

Figure 2:
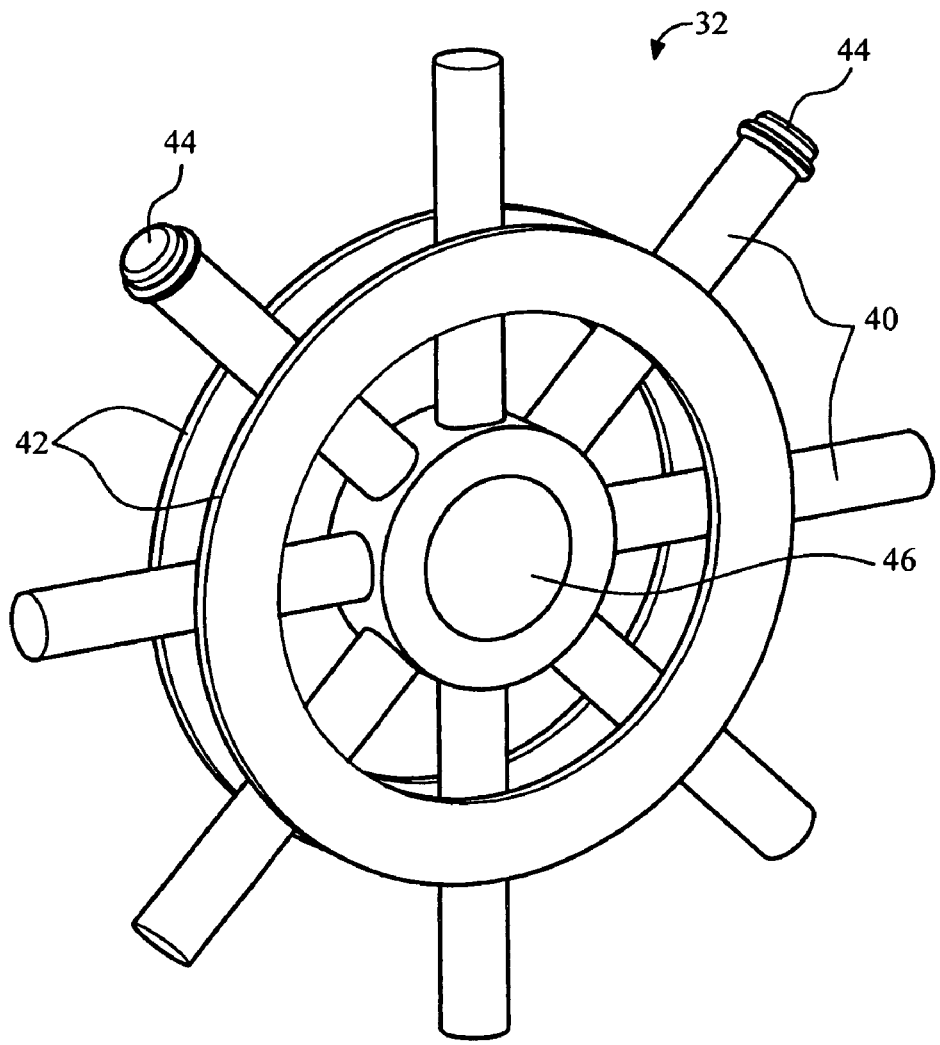
FIG. 2 is a perspective view of a steering wheel-shaped joystick according to the present invention.

Referring to FIG. 2, it illustrates a perspective view of the steering wheel-shaped joystick 32 of the present invention. The steering wheel-shaped joystick 32 includes a plurality of rods 40 which are radiantly distributed. In general, the steering wheel-shaped joystick 32 including at least 6 rods will be similar to the steering wheel of real ships or vehicles. The steering wheel-shaped joystick 32 further includes at least one ring-shaped frame 42, and the rods 40 are radiantly distributed at the one ring-shaped frame 42. As shown in FIG. 2, the rods 40 are radiantly distributed between two opposite ring-shaped frame 42. In this light, the steering wheel-shaped joystick 32 is securely fixed and has a better aesthetic appearance.

At least one the rod 40 includes one button 44 at its end. The button 44 is used to generate a function signal and send it to the arcade game machine 30.

According to a preferred embodiment of the present invention, two rods 40 respectively have two buttons 44 at their ends, and one of the buttons 44 is used to generate a left-side shooting function signal and the other of the buttons 44 is used to generate a right-side shooting function signal. If both of the buttons 44 are activated simultaneously, a middle area shooting function signal is generated. A central button 46 is positioned at the center of the steering wheel-shaped joystick 32 and used to generate a special function signal such as "game start", "ultimate weapon" function signal.

Figure 3:
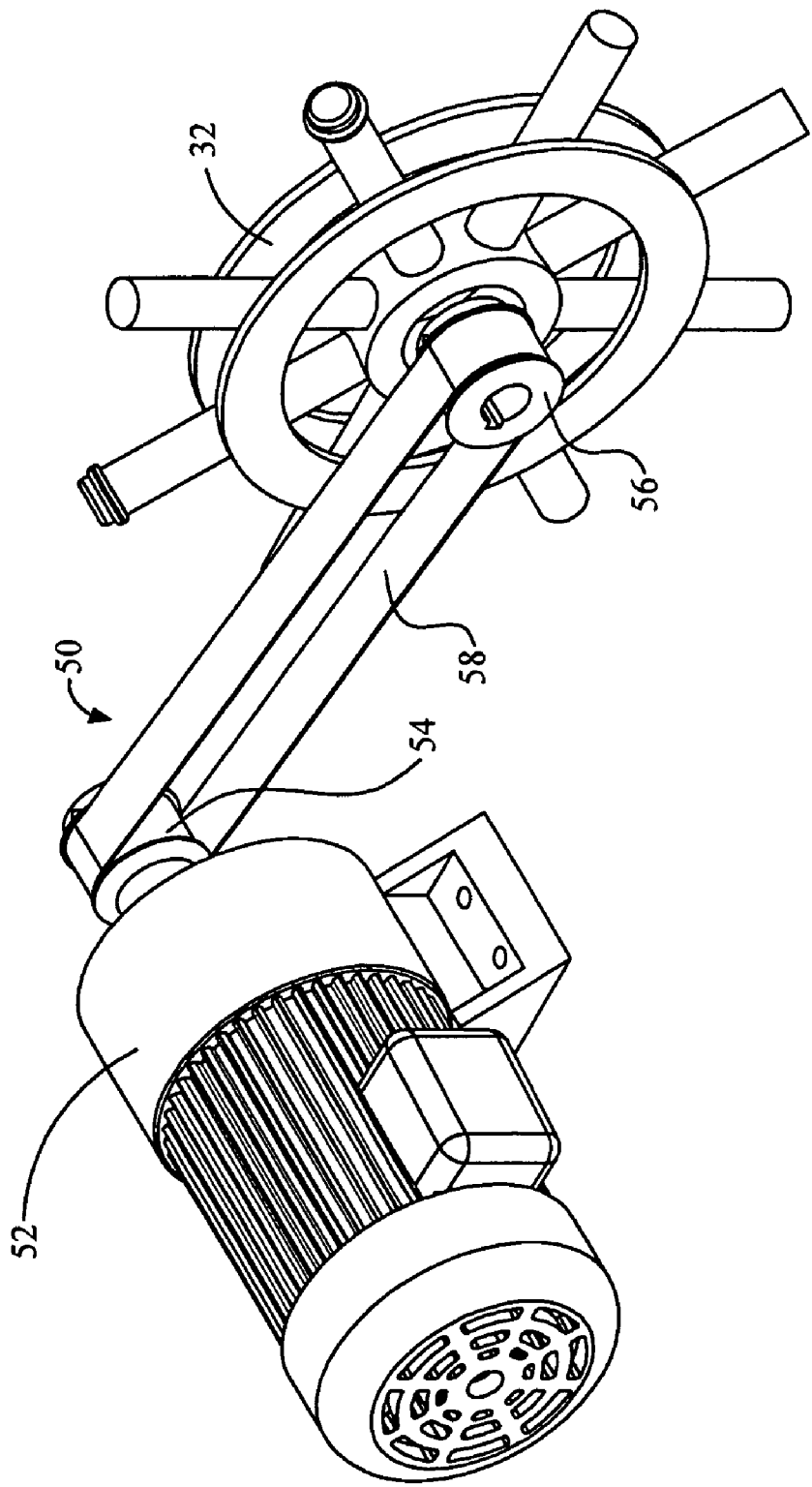
FIG. 3 is a perspective view of a feedback system of the present invention.

Referring to FIG. 3, it illustrates a perspective view of a feedback system 50 of the present invention. The arcade game machine 30 further includes a feedback system 50 which is used to make the steering wheel-shaped joystick 32 vibrate. The feedback system 50 includes an electrical motor 52, a first transmission wheel 54, a second transmission wheel 56 and a transmission belt 58.

The electrical motor 52 is used to generate power. The first transmission wheel 54 is fixedly positioned at one end of the spindle of the electrical motor 52, and the second transmission wheel 56 is fixedly positioned at the center of the steering wheel-shaped joystick 32. The transmission belt 58 is used to connect the first transmission wheel 54 and the second transmission wheel 56 so as to convey power.

If certain events happen in the electronic game such as ship collision, then a driving signal is generated to drive the electrical motor 52 to rotate back and forth. The power generated by the electrical motor 52 is conveyed to the steering wheel-shaped joystick 32 through the first transmission wheel 54, the transmission belt 58 and the second transmission wheel 56. In this light, the steering wheel-shaped joystick 32 is forced to rotate back and forth in a short period so that users will feel the vibration like ship collision.

Additionally, the arcade game machine 30 includes hardware such as a printed circuit board, circuit components on the printed circuit board, processor, memories etc and software storied at the memories. As described above, when the direction signals and the function signals are transmitted from the steering wheel-shaped joystick 32 to the arcade game machine 30, the hardware and software can contribute to control the ship of the electronic game.

Thus, the steering wheel-shaped joystick 32 is used to control the ship-related electronic games of the arcade game machine 30, and the steering wheel-shaped joystick 32 provides glamorous appearance and realistic feel and convenience of navigation with users. The users are appealed to the electronic games so it promotes market growth of the arcade game machines industry.

While the invention has been described with reference to the preferred embodiments, the description is not intended to be construed in a limiting sense. It is therefore contemplated that the appended claims will cover any such modifications or embodiments as may fall within the scope of the invention defined by the following claims and their equivalents.

What is claimed is:

1. A steering wheel-shaped joystick for an arcade game machine, comprising a plurality of rods which are radiantly distributed and at least one button positioned at the end of at least one rod of the rods, and wherein the steering wheel-shaped joystick is rotated to generate a direction signal and send the directional signal to the arcade game machine and the button is used to generate a direction signal and send the directional signal to the arcade game machine.

2. The steering wheel-shaped joystick as claimed in claim 1, wherein the direction signal further includes a left-side signal and a right-side signal, and the left-side signal is generated when the steering wheel-shaped joystick is counter-clockwise rotated, and the right-side signal is generated when the steering wheel-shaped joystick is clockwise rotated.

3. The steering wheel-shaped joystick as claimed in claim 1, wherein the steering wheel-shaped joystick including at least 6 rods.

4. The steering wheel-shaped joystick as claimed in claim 1, wherein the steering wheel-shaped joystick further at least one ring-shaped frame so as to connect the rods which are radiantly distributed.

5. The steering wheel-shaped joystick as claimed in claim 1, wherein two buttons are respectively positioned at the ends of the two rods.

6. The steering wheel-shaped joystick as claimed in claim 1, wherein one of the buttons is used to generate a left-side shooting function signal and the other of the buttons is used to generate a right-side shooting function signal, and wherein a middle area shooting function signal is generated when both of the buttons are activated simultaneously.

7. The steering wheel-shaped joystick as claimed in claim 1, wherein a central button is positioned at the center of the steering wheel-shaped joystick and used to generate a special function signal.

8. The steering wheel-shaped joystick as claimed in claim 1, wherein the arcade game machine is used to deal with the ship-related electronic games and displays images of the ship-related electronic games.

9. The steering wheel-shaped joystick as claimed in claim 8, wherein the direction signals and the function signals are transmitted from the steering wheel-shaped joystick to the arcade game machine, and the software of the electronic game can contribute to control the ship of the electronic game.

10. The steering wheel-shaped joystick as claimed in claim 1, wherein the arcade game machine further includes a feedback system, and the feedback system comprising:
   an electrical motor, used to generate power;
   a first transmission wheel, fixedly positioned at the end of spindle of the electrical motor;
   a second transmission wheel, fixedly positioned at the center of the steering wheel-shaped joystick; and
   a transmission belt, used to connect the first transmission wheel and the second transmission wheel so as to convey power,
   wherein responsive to certain event happens in the electronic game, a driving signal is generated to drive the electrical motor to rotate back and forth, and the power generated by the electrical motor is conveyed to the steering wheel-shaped joystick through the first transmission wheel, the transmission belt and the second transmission wheel so the steering wheel-shaped joystick is forced to rotate back and forth.

* * * * *